United States Patent
Takahara et al.

(10) Patent No.: US 10,497,206 B2
(45) Date of Patent: Dec. 3, 2019

(54) GAME APPARATUS AND GAME CONTROLLING METHOD

(71) Applicant: SEGA SAMMY CREATION INC., Yokohama-shi, Kanagawa (JP)

(72) Inventors: Yudai Takahara, Tokyo (JP); Taiji Sugai, Tokyo (JP)

(73) Assignee: SEGA SAMMY CREATION INC., Yokohama-shi, Kanagawa (JP)

( * ) Notice: Subject to any disclaimer, the term of this patent is extended or adjusted under 35 U.S.C. 154(b) by 0 days.

(21) Appl. No.: 15/544,783

(22) PCT Filed: May 17, 2016

(86) PCT No.: PCT/JP2016/064549
§ 371 (c)(1),
(2) Date: Jul. 19, 2017

(87) PCT Pub. No.: WO2017/199320
PCT Pub. Date: Nov. 23, 2017

(65) Prior Publication Data
US 2018/0261045 A1    Sep. 13, 2018

(51) Int. Cl.
*G07F 17/32* (2006.01)
*A63F 13/80* (2014.01)
*G07F 17/34* (2006.01)

(52) U.S. Cl.
CPC .......... *G07F 17/3227* (2013.01); *A63F 13/80* (2014.09); *G07F 17/3213* (2013.01); *G07F 17/3267* (2013.01); *G07F 17/34* (2013.01)

(58) Field of Classification Search
CPC .... G07F 17/3267; G07F 17/326; G07F 17/34; G07F 17/3244
(Continued)

(56) References Cited

U.S. PATENT DOCUMENTS

| 8,246,443 B2 * | 8/2012 | Randall | G07F 17/32 |
| | | | 463/20 |
| 8,616,954 B2 * | 12/2013 | Little | G07F 17/3265 |
| | | | 463/20 |

(Continued)

FOREIGN PATENT DOCUMENTS

| JP | 2009-017977 A | 1/2009 |
| JP | 2011-004812 A | 1/2011 |

(Continued)

*Primary Examiner* — Michael A Cuff
(74) *Attorney, Agent, or Firm* — Drinker Biddle & Reath LLP

(57) ABSTRACT

A game apparatus possesses a symbol display controlling function, a parameter controlling function and a granting function. The symbol display controlling function makes one or a plurality of symbols randomly displayed. The parameter controlling function increases a value of a parameter which has been set in advance in correspondence with a displayed number of predetermined symbols in a plurality of parameters in accordance with a result of display of the symbol(s) by the symbol display controlling function. When the value of the parameter has reached a predetermined value, the granting function grants a privilege according to the parameter which has reached the predetermined value concerned. The game apparatus realizes a game of higher entertaining property.

5 Claims, 4 Drawing Sheets

(58) Field of Classification Search
USPC .................................................... 463/16–20
See application file for complete search history.

(56) References Cited

U.S. PATENT DOCUMENTS

| | | | |
|---|---|---|---|
| 2003/0222402 A1* | 12/2003 | Olive | G07F 17/3258 |
| | | | 273/292 |
| 2009/0017901 A1 | 1/2009 | Fujimoto et al. | |
| 2015/0018070 A1* | 1/2015 | Meyer | G07F 17/34 |
| | | | 463/20 |
| 2015/0031436 A1 | 1/2015 | Suda | |
| 2015/0379809 A1* | 12/2015 | Clarebrough | G07F 17/34 |
| | | | 463/20 |
| 2016/0093145 A1 | 3/2016 | Kitamura et al. | |
| 2017/0294079 A1* | 10/2017 | Caputo | G07F 17/3262 |

FOREIGN PATENT DOCUMENTS

| | | |
|---|---|---|
| JP | 2011-030895 A | 2/2011 |
| JP | 2015-024139 A | 2/2015 |
| JP | 2016-064080 A | 4/2016 |

* cited by examiner

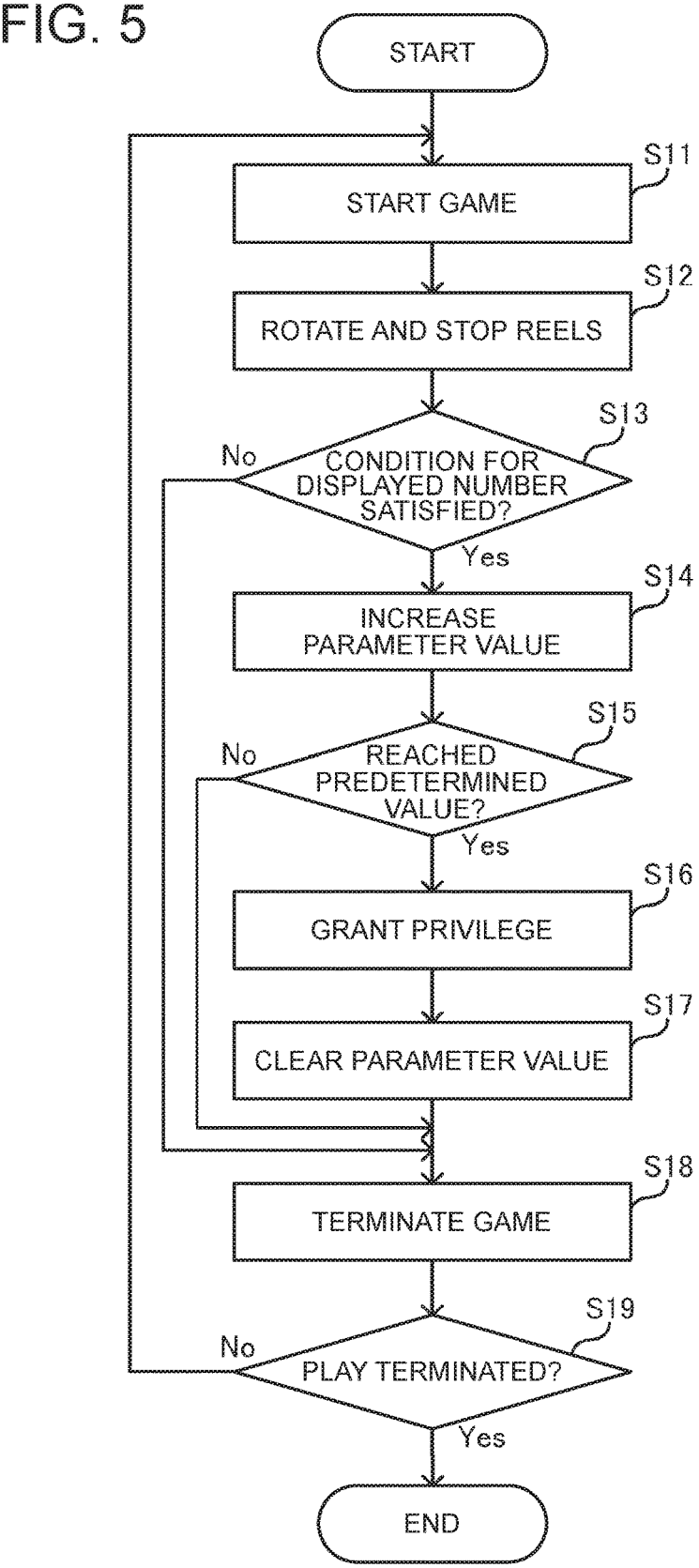

GAME APPARATUS AND GAME CONTROLLING METHOD

CROSS-REFERENCE TO RELATED APPLICATIONS

This application is the U.S. national phase of the International Patent Application No. PCT/JP2016/064549 filed May 17, 2016, the entire content of which is incorporated herein by reference.

TECHNICAL FIELD

The present disclosure relates to a game apparatus and a game controlling method.

BACKGROUND

Recently, various game apparatuses have been developed. For example, in Japanese Patent Application Laid-Open No. 2015-024139, a game apparatus which displays some of virtual reels on a display unit and spins them and thereby makes playing of a slot game possible under the control of a computer is disclosed. In such a slot game, the game apparatus spins a plurality of the reels in accordance with an operation of a player and sequentially stops the respective reels, and displays a combination of symbols on the reel on the display unit. Thereafter, the game apparatus grants a privilege to the player on the basis of the kinds and arrangement of the symbols displayed on the display unit.

SUMMARY

The entertaining property of the game is a major matter of concern for the player and the entertaining property of the game is greatly changed depending on what kind of privilege is granted under which condition.

The present disclosure has been made in view of the above, and the subject thereof is to provide a technique pertaining to the game of higher entertaining property.

A game apparatus in one aspect of the present disclosure is the game apparatus which has possessed a control unit and a storage unit and the control unit is configured to execute a program stored in the storage unit and thereby to realize a symbol display controlling function of making it display one or a plurality of symbol(s), a parameter controlling function of making it increase a value of a parameter which has been set in advance in correspondence with a displayed number of predetermined symbols in a plurality of parameters which has been set in advance in accordance with the displayed symbol and a granting function of, when the value of the parameter has reached a predetermined value, granting a privilege according to the parameter which has reached the predetermined value concerned.

A game controlling method in one aspect of the present disclosure is the game controlling method which is performed by a game apparatus which has possessed a control unit and a storage unit and comprises that the control unit executes a program stored in the storage unit and thereby performs a symbol display controlling step of making it display one or a plurality of symbol(s), a parameter controlling step of making it increase a value of a parameter which has been set in advance in correspondence with a displayed number of predetermined symbols in a plurality of parameters which has been set in advance in accordance with the displayed symbol and a granting step of, when the value of the parameter has reached a predetermined value, granting a privilege according to the parameter which has reached the predetermined value concerned.

According to the present disclosure, it is possible to provide a technique relating to a game of higher entertaining property.

BRIEF DESCRIPTION OF THE DRAWINGS

Various embodiments of the disclosure are illustrated in the drawings, in which:

FIG. 5 is a flowchart for describing processing by the game apparatus in one embodiment.

DETAILED DESCRIPTION

In the following, embodiments of the present disclosure will be described with reference to the drawings. However, the embodiments which will be described in the following are merely illustrative and there is no intention of excluding application of various alterations and techniques which are not clearly described in the following. That is, the present disclosure may be performed by altering it in a variety of ways (combining together the respective embodiment and so forth) within a range not deviating from the gist thereof. In addition, in the following description of the drawings, the same or similar parts are indicated by assigning the same or similar symbols thereto. The drawings are schematic ones and are not always consistent with actual dimensions, ratios and so forth. There are cases where parts that mutual dimensional relations and ratios are different from one another also among the drawings are included.

In the following, a game apparatus and a program in the embodiments of the present disclosure will be described using the drawings.

External Configuration Example of the Game Apparatus

Figure 1:
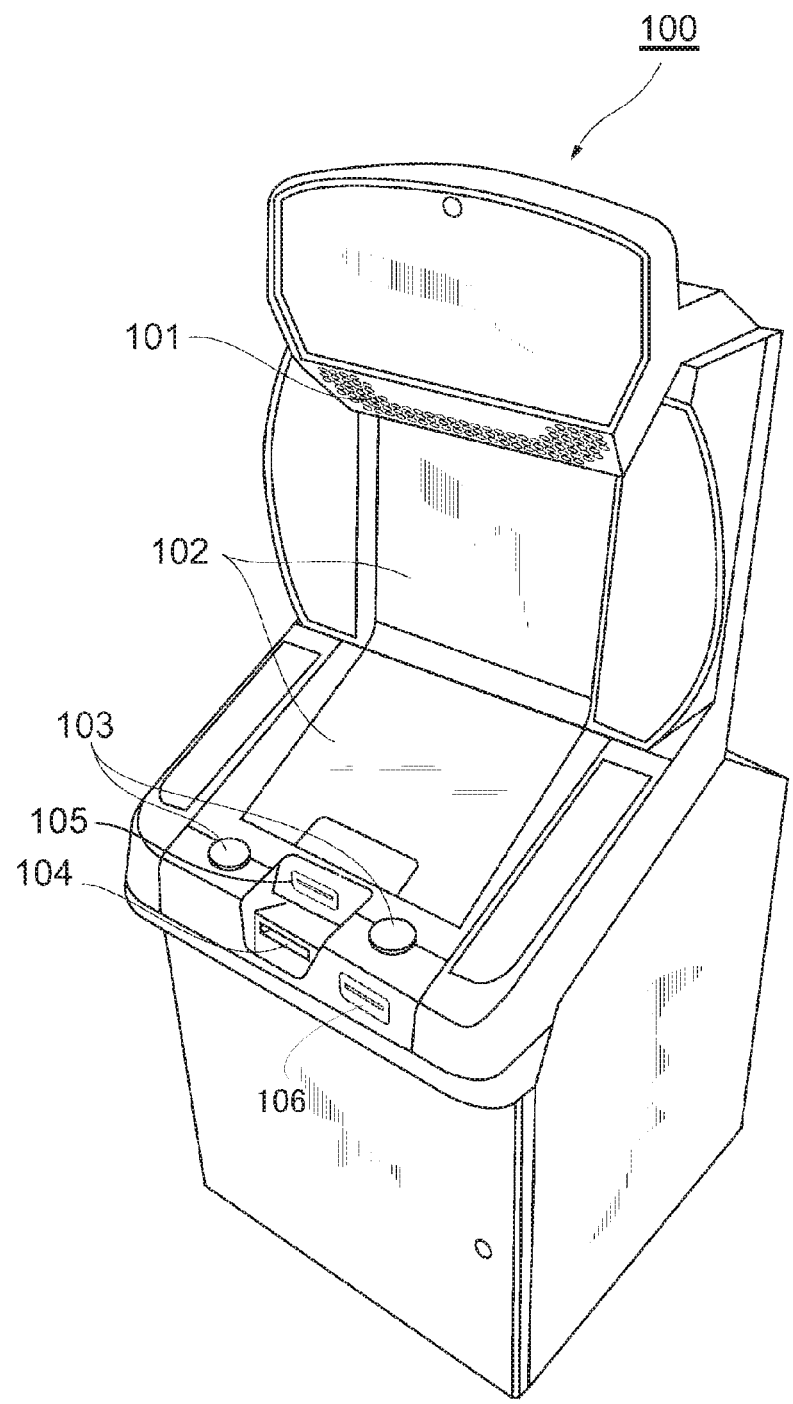
FIG. 1 is an external perspective view of a game apparatus in one embodiment.

FIG. 1 is an external perspective view of the game apparatus in the embodiment. A game apparatus 100 illustrated in FIG. 1 is the game apparatus to be installed in a casino, an amusement facility and so forth. In the present embodiment, it becomes possible for a player to play a slot game by the game apparatus 100.

As illustrated in FIG. 1, the game apparatus 100 possesses a loudspeaker 101, a plurality of display devices 102, a plurality of operation buttons (in the following, called an "operation input device" 103), a card reading device 104, a bill putting-in device 105, and a ticket ejecting device 106 in appearance. The loudspeaker 101 is sound output means which outputs speech guidance, sound effects and so forth of a game. The display device 102 is display means which displays images (for example, a still image, a moving image, a video image and so forth) for expressing or dramatizing the game. The operation input device 103 is configured by the plurality of buttons and the buttons are adapted to input instructions from the player into the game apparatus. Incidentally, the operation input device 103 is not limited to such a configuration and may have any configuration if it is the configuration which enables the player to input the instructions. The card reading device 104 is a card reader which reads information out of a card that the player holds. The bill putting-in device 105 is a device which reads bills and tickets which have been put into it. The ticket ejecting device 106 is ticket output means which ejects the card to the player.

The card which is read by the card reading device 104 is a medium in which play information of the player has been stored. It is possible to additionally store, for example, points and so forth which have been acquired depending on a playing situation of the player into the card. Although it is possible for the player to obtain various kinds of service in accordance with the information stored in the card, memory content in the card does not exert influence on a play result.

Hardware Configuration Example of the Game Apparatus

Figure 2:
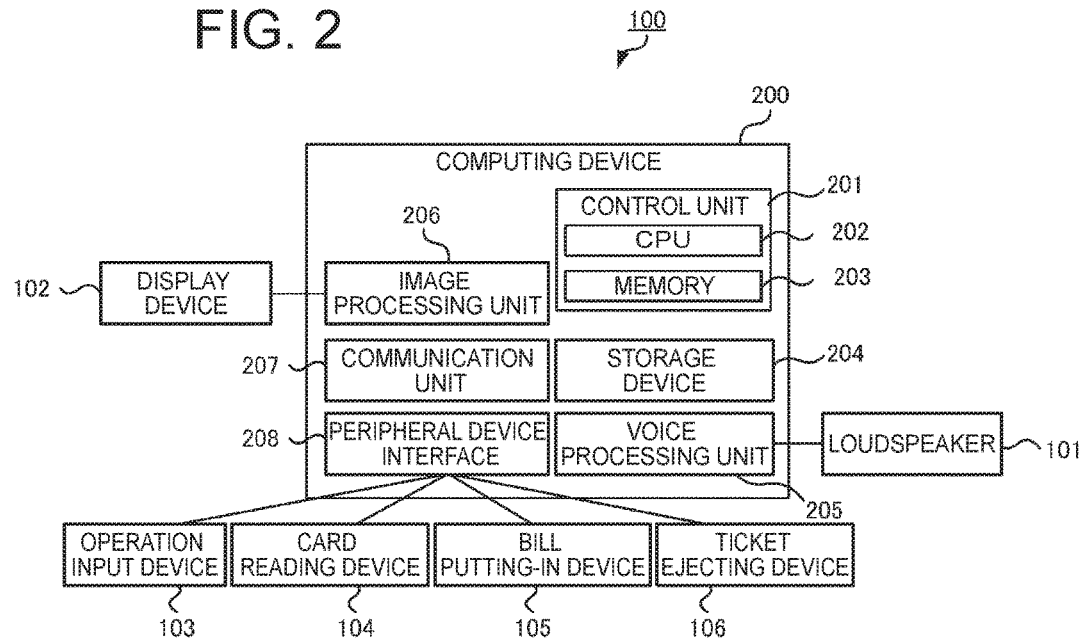
FIG. 2 is a block diagram illustrating main hardware configurations of the game apparatus in one embodiment.

An example of the hardware configurations of the game apparatus 100 will be described with reference to FIG. 2. As illustrated in FIG. 2, the game apparatus 100 possesses a computing device 200, the loudspeaker 101, the display device 102, the operation input device 103, the card reading device 104, the bill putting-in device 105 and the ticket ejecting device 106 as the hardware configurations.

The computing device 200 is a control device which all-inclusively controls the game apparatus 100. The computing device 200 in the present embodiment comprises a control unit 201, a storage device 204, a voice processing unit 205, an image processing unit 206, a communication unit 207, and a peripheral device interface 208 as the main hardware configurations.

The control unit 201 comprises a CPU (Central processing Unit) 202 and a memory 203. For example, the CPU 202 executes a predetermined software program (for example, a game software program) which has been stored in the memory 203 and the storage device 204 and so forth and thereby the computing device 200 controls processes and operations of other hardware configurations and functions as means for realizing various functions. That is, the computing device 200 executes the predetermined program under the control of the control unit 201 and thereby realizes a game function in cooperation with other hardware. Incidentally, only the main configurations that the computing device 200 possesses are illustrated in FIG. 2 and the computing device 200 possesses other configurations that a general information processing device possesses.

The storage device 204 is configured by a hard disk and so forth. Data reading and writing are performed on the storage device 204 by the control unit 201. Data such as the software program and so forth required for processing in the computing device 200 is written into the storage device 204 and in addition data on a result of processing concerned is written into it. The voice processing unit 205 performs various kinds of sound processing under the control of the control unit 201. The image processing unit 206 performs various kinds of graphics processing under the control of the control unit 201. The communication unit 207 is an interface which makes communication with a server and other game apparatuses possible. The peripheral device interface 208 is an interface which makes communication between the computing device 200 and peripherals such as the operation input device 103, the card reading device 104, the bill putting-in device 105 and the ticket ejecting device 106 and so forth possible.

Game Content Example

Next, one example of the content of a game playing of which is made possible for a user by the game apparatus 100 of the present embodiment will be described. The game apparatus 100 develops the game software program which has been stored in the storage device 204 and so forth on the memory 203 and executes it under the control of the control unit 201 and the various configurations that the game apparatus 100 has are controlled, and thereby this game is realized.

First, the player puts the card that he holds into the card reading device 104 of the game apparatus 100 and/or puts a coin into the bill putting-in device 105 in order to start the game. When the card or the coin has been put into it, it becomes possible for the player to hold credit according to the card balance or the coin in the game.

Then, the game apparatus 100 makes a bet screen through which the player bets on the slot game display on the display device 102. The game apparatus 100 starts the slot game in accordance with betting and start instructions by the player. In the following description, the game playing of which becomes possible by putting the coin and so forth into it so as to pay money for it in this way will be called a "normal game". On the other hand, a game playing of which becomes possible free of charge without paying money for it will be called a "free game" in the following description. In the normal game or the free game, first, the game apparatus 100 rotates a plurality of virtual reels (for example, 5 reels. In the following, the virtual reels will be also called the "reels" simply.) and stops rotation at a random timing reel by reel. After stopped, a part of each reel is displayed on the display device 102.

Figure 3:
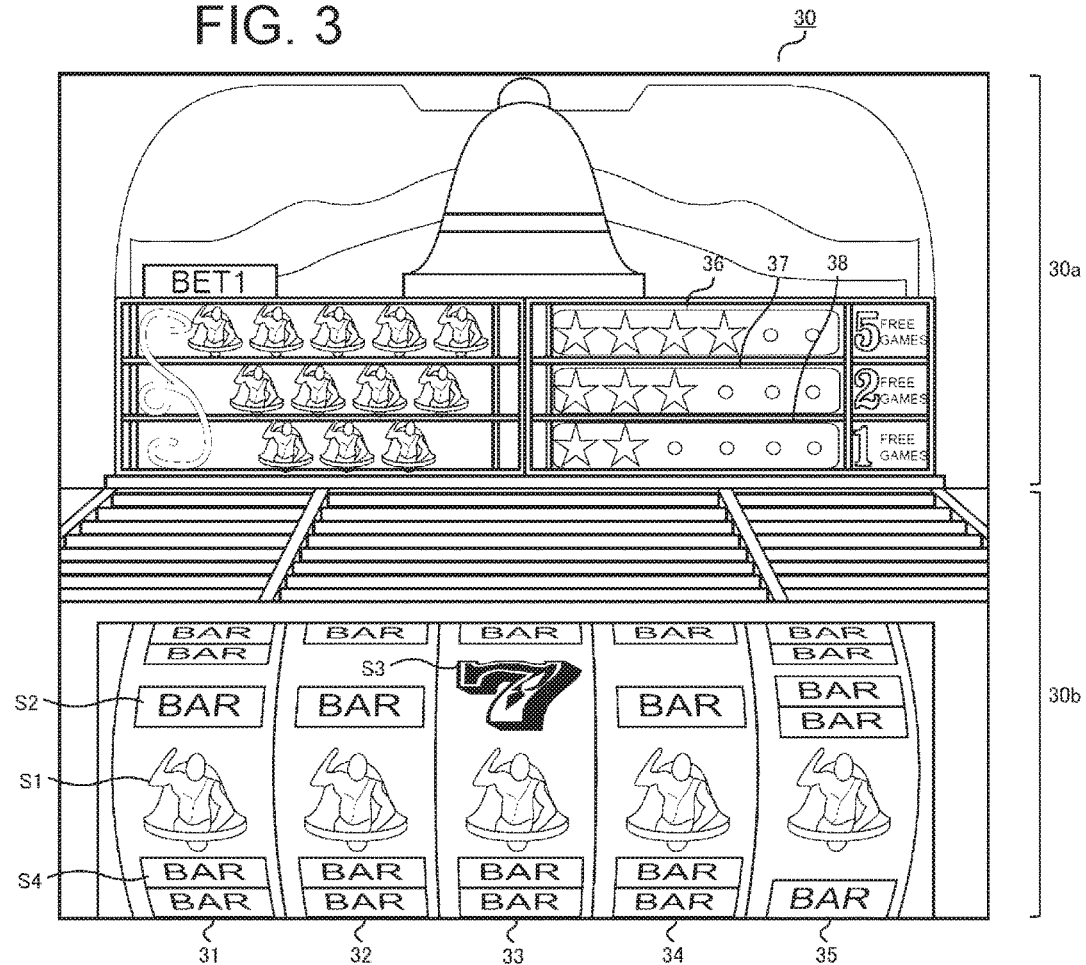
FIG. 3 is a conceptual diagram illustrating an example of a screen to be displayed on a display device in one embodiment.

An exemplary screen 30 to be displayed on the display device 102 is illustrated in FIG. 3. The screen 30 comprises a region 30a and a region 30b. An example of display of symbols (patterns) indicated on the part of each reel after rotation of the reels has been stopped is illustrated in the region 30b. In this example, the display device 102 displays 5 reels of reels 31 to 35 in the region 30b. 4 symbols are displayed on each reel. In addition, a plurality of kinds of symbols is displayed on the reel and symbols S1, S2, S3, S4 are displayed in this example.

Various privileges are granted to the player in accordance with whether a way of arraying the symbols which have been displayed on the display device 102 in this way after rotation of the reels has been stopped follows a line (a pay line) which has been set in advance (or selected) or not. In addition, points (values of parameters) are accumulated in accordance with a number that the predetermined symbol has been displayed on the display device 102 after rotation of the reels has been stopped and the various privileges are granted to the player in accordance with the accumulated points concerned.

The region 30a is a region adapted to display the value of the parameter which is accumulated in accordance with the displayed number of predetermined symbols in the region 30b after rotation of the reels has been stopped. Gauges 36, 37, 38 are displayed in the region 30a. Each of the gauges 36, 37, 38 is a gauge adapted to indicate the accumulated value for each of different parameters. Each of the gauges 36, 37, 38 is set in correspondence with the displayed number of the predetermined symbols in the region 30b after rotation of the reels has been stopped. In this example, the gauge 36 is a gauge which indicates the value of the parameter which is accumulated (increased) when 5 symbols S1 have been displayed in the region 30b. The gauge 37 is a gauge which indicates the value of the parameter which is accumulated (increased) when 4 symbols S1 have been displayed in the region 30b. The gauge 38 is a gauge which indicates the value of the parameter which is accumulated (increased) when 3 symbols S1 have been displayed in the region 30b.

For example, in a case where 5 symbols S1 have been displayed in the region 30b after rotation of the reels has been stopped, a star-shaped symbol is additionally displayed on the gauge 36 in the region 30a and thereby the value of the parameter is increased. That is, the accumulated value of the parameter is indicated on the gauge 36 in the form of the number of the star-shaped symbols. In the example illustrated in FIG. 3, when 6 star-shaped symbols have been displayed on one gauge (that is, when the value of the parameter has reached a predetermined value), the privilege is granted to the player. The privilege to be granted is made different according to which parameter value has reached the predetermined value.

Though there is no particular limitation, for example, the credit and the free game are granted as the privileges. In addition, the privileges of various values from a big win to a small win are set in accordance with the arrangement and the kinds of the symbols which have been displayed.

In the following, the free game will be further described. When the arrangement and the kinds of the symbols which have been displayed on the display device 102 after spinning of the reels has been stopped in the normal game have satisfied a predetermined condition, the game apparatus 100 shifts to a state of making playing of the free game possible. That is, when the arrangement of the symbols displayed and the points so accumulated as described above have satisfied the predetermined condition, the right to play the free game is granted to the player. The above-mentioned predetermined condition will be described later. Thereafter, it becomes possible for the player to continuously play the free game the predetermined number of times (for example, 5 times). Also in the free game, various privileges such as the credit, retrigger and so forth are granted to the player in accordance with the way of arraying the symbols and the arrangement of the predetermined symbols after rotation of the reels has been stopped. Here, the retrigger is the privilege that it becomes possible to play the free game further the predetermined number of times (for example, 5 times).

When playing of all the free games is completed, the game apparatus 100 again shifts to the state of making playing of the normal game possible. Incidentally, the time from when betting or the start instructions by the player becomes possible until when presence/absence of granting of the privilege becomes clear in accordance with the stop positions of the reels is defined as one game unit. After presence/absence of granting of the privilege in a first game has become clear, it becomes possible for the player to make a bet or to perform instructions of the start in a second game following the first game.

Functional Configuration Examples of the Game Apparatus

Next, examples of the functional configurations of the game apparatus 100 of the present embodiment will be described.

Figure 4:
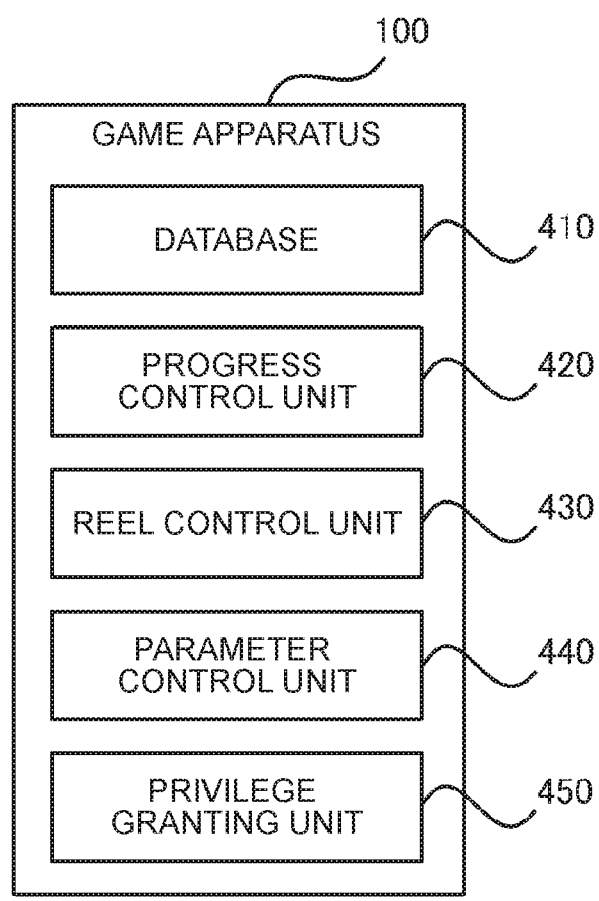
FIG. 4 is a block diagram illustrating main functional configurations of the game apparatus in one embodiment.

FIG. 4 is a block diagram illustrating the functional configurations of the game apparatus 100 of the present embodiment. As illustrated in the drawing, the game apparatus 100 mainly possesses a database 410, a progress control unit 420, a reel control unit 430, a parameter control unit 440, and a privilege granting unit 450 as the functional configurations. For example, the control unit 201 develops the game software program which has been stored in a storage unit such as the storage device 204 and so forth on the memory 203 and executes it and thereby these functional configurations are realized by cooperation between the program (the software) and the hardware that the game apparatus 100 has. Incidentally, although the game apparatus 100 has other functions that a general game apparatus has, other than the functions illustrated in FIG. 4, description thereof is omitted here.

The database 410 stores various kinds of information such as information which is necessary for processes executed by the game apparatus 100 and information which has been generated by the processes concerned and so forth. The database 410 stores, for example, a control software program for controlling the progress of the game, image (for example, the still image, the moving image, the video image and so forth) data and sound data for expressing or dramatizing the game, and data pertaining to the state of the game which is in progress and so forth.

The progress control unit 420 performs a process for controlling the progress of the game in accordance with the operation to the game apparatus 100 by the player of the game and the control software program stored in the database 410. In particular, the progress control unit 420 performs control of the progress of the normal game, control of switching from the normal game to the free game, control of the progress of the free game and control of switching from the free game to the normal game of the slot such as that described above.

For example, the progress control unit 420 controls the privilege granting unit 450 which will be described later so as to enter the state of making playing of the free game possible or so as to grant the right to play the free game to the player at a desired timing when the parameter and so forth which have been accumulated in accordance with the symbols which have been displayed on the display device 102 after rotation of the reels has been stopped in the normal game satisfy the predetermined condition. When it has entered the state of making playing of the free game possible, the progress control unit 420 controls so as to continuously execute the free game the predetermined number of times (for example, 5 times). Here, granting of the right to play the free game to the player specifically means that the privilege granting unit 450 stores data indicating that it is possible for the player concerned to play the free game into the database 410 in accordance with, for example, the control of the progress control unit 420.

Thereafter, the progress control unit 420 refers to the database 410 and specifies whether it is possible for the player concerned to play the free game or not on the basis of the data concerned and, in a case where it is possible, controls playing of the free game. In addition, the above-mentioned controls by the progress control unit 420 are performed in accordance with results of the processes by the reel control unit 430, the parameter control unit 440 and the privilege granting unit 450 which will be described later.

The reel control unit 430 controls spinning and stopping of the reels and display of the video image of the reels concerned on the display device 102 in the slot game. The images of the plurality of symbols are indicted on the surfaces of the reels and the reel control unit 430 controls so as to display some symbols in the plurality of symbols concerned on the display device 102.

While the reels are spinning, the reel control unit 430 displays the symbols indicated at the positions according to spinning in the plurality of symbols indicated on the reels while sequentially scrolling them and thereby sequentially changes the display on the display device 102. Thereafter, the reel control unit 430 controls so as to stop scrolling of the display by stopping spinning of the reels at the predetermined timing. The reel control unit 430 is capable of determining, for example, the stopping positions of the reels randomly.

In the case of the example illustrated in FIG. 3, the reel control unit 430 controls spinning and stopping of each of the 5 reels. In addition, in FIG. 3, in the plurality of the symbols indicated on one reel, 4 symbols are displayed on the display device 102. Accordingly, in this example, in the plurality of symbols indicated on the 5 reels, 20 symbols in total are displayed on the display device 102 by the control of the reel control unit 430. That is, the reel control unit 430 functions as symbol display control means adapted to control so as to display one or the plurality of symbol(s) on the display device 102 randomly.

The parameter control unit 440, first, decides whether a result of display of the symbols for every game (the normal game or the free game) by the reel control unit 430 satisfies a predetermined condition (for example, the condition for the displayed number of the predetermined symbols). When it satisfies the condition concerned, the parameter control unit 440 controls so as to increase the value of the parameter which has been set in advance in correspondence with the displayed number of the predetermined symbols in the aforementioned plurality of parameters which has been set in advance in accordance with the result of display concerned. As previously described with reference to FIG. 3, the plurality of parameters is provided and in the plurality of parameters, the value of the parameter according to the displayed number of the predetermined symbols in the region 30b after rotation of the reels has been stopped is accumulated. Each of the plurality of parameters is set in correspondence with each of different displayed numbers (for example, the displayed numbers 3, 4 and 5) of the predetermined symbols after rotation of the reels has been stopped.

For example, when 5 predetermined symbols (for example, the symbol S1 in FIG. 3) have been displayed on the display device 102 after rotation of the reels has been stopped by the control of the reel control unit 430, the parameter control unit 440 increases the value of the parameter which has been set in correspondence with the displayed number 5. Incidentally, an amount of increase of the value of the parameter by the parameter control unit 440 may be fixed and/or may be determined by drawing lots. For example, lots-drawing is performed every time rotation of the reels is stopped and it is allowed to determine the amount of increase of the value of the parameter in accordance with a result of the lots-drawing concerned.

The privilege granting unit 450 controls so as to grant various privileges to the player in accordance with whether the way of arranging the symbols which have been displayed on the display device 102 for every game follows the line (the pay line) which has been set (or selected) in advance. In addition, when the value of the parameter which has been increased in accordance with a result of each game by the parameter control unit 440 has reached the predetermined value, the privilege granting unit 450 controls so as to grant the privilege which has been set in advance in correspondence with the parameter which has reached the predetermined value concerned. Granting of the privilege specifically means that, for example, the privilege granting unit 450 stores data indicating that it is possible for the player who will receive granting of the privilege to utilize the privilege concerned into the database 410. For example, the credit and the right to play the free game are granted to the player as the privileges.

According to the present embodiment, when the value of the parameter which has been accumulated in accordance with the result of each game has reached the predetermined value in addition to the case where the way of arranging the symbols which have been displayed on the display device 102 for every game follows the line (the pay line) which has been set (or selected) in advance, the privilege which has been set in advance in correspondence with the parameter which has reached the predetermined value concerned is granted in this way. As a result, it is allowed to stepwise raise expectations of the player for the privileges throughout the plurality of games. Accordingly, it is allowed to realize the game of higher entertaining property.

In addition, the privilege granting unit 450 controls so as to grant a more valuable privilege as the displayed number of the predetermined symbols which has been set in advance in correspondence with the parameter which has reached the predetermined value is increased. For example, in the example illustrated in FIG. 3, the parameters which are respectively indicated on the gauges 36, 37, 38 are respectively set in advance in correspondence with the displayed numbers 5, 4, 3 of the symbol S1. At this time, it is controlled such that the more valuable privilege is granted when the value of the parameter which has been set in correspondence with the displayed number 5 has reached the predetermined value than when the value of the parameter which has been set in correspondence with the displayed number 4 or 3 has reached the predetermined value.

In this example, in a case where the privilege is the right to play the free game, the right to play the free game the larger number of times as the displayed number of the symbols S1 which has been set in advance in correspondence with the parameter which has reached the predetermined value is increased is granted as the privilege. That is, in the example in FIG. 3, it is allowed to control such that in a case where the parameter indicated on the gauge 36 has reached the predetermined value (in a case where 6 stars have been saved), the right to play the free game 5 times is granted to the player, in a case where the parameter indicated on the gauge 37 has reached the predetermined value, the right to play the free game 2 times is granted to the player, and in a case where the parameter indicated on the gauge 38 has reached the predetermined value, the right to play the free game 1 time is granted to the player.

In addition, after the privilege according to the parameter which has reached the predetermined value has been granted by the privilege granting unit 450, the parameter control unit 440 is able to clear the value of the parameter which has reached the predetermined value concerned and to maintain the values of other parameters. For example, in the example in FIG. 3, it is able to set accumulation of the stars to zero in regard to the parameter for which 6 stars have been accumulated and to maintain accumulation of the stars for other parameters. The player is able to maintain motivation for playing by clearing only the values of some parameters and maintaining accumulation of the values of other parameters in this way after the privilege has been granted. That is, the player is able to maintain motivation for playing by further accumulating the value in regard to the parameter the value of which is accumulated and expecting to obtain other privileges still after the privilege has been granted. As a result, it is allowed to realize the game of higher entertaining property.

Process Flow

Next, a flow of a process of accumulating the point (the value of the parameter) in accordance with the number of predetermined symbols displayed on the display device 102 after rotation of the reels has been stopped and granting the privilege to the player in accordance with the accumulated point concerned in the slot game in the processing executed in the game apparatus 100 will be described with reference to FIG. 5.

The control unit 201 develops the software program stored in the storage device 204 and so forth on the memory 203 and performs execution thereof and so forth and thereby this process is executed by cooperation between the program (the software) and the hardware that the game apparatus 100 has. Incidentally, it is possible to execute respective process steps included in the process flow which will be described in the following by optionally changing the order or in parallel with one another within a range not inducing a contradiction in process details. In addition, another step may be added between the respective process steps within the range not inducing the contradiction in process details. In addition, it is possible to execute the step which is described as one step for convenience by dividing into the plurality of steps and, on the other hand, it is possible to grasp the one which is described by being divided into the plurality of steps for convenience as one step. Incidentally, since the process details of the respective process steps have already been described, they are omitted here.

First, in step S11, the control unit 201 starts execution of the slot game in accordance with putting-in of the bet for the game and operation instructions to the game apparatus 100 by the player and moves the game forward. That is, the control unit 201 manages execution of the game. Thereafter, the process proceeds to step S12. Incidentally, the slot game concerned may be the normal game or the free game. When it is the free game, bet putting-in for starting it is not needed.

In step S12, the control unit 201 controls so as to read a plurality of reel images comprising symbol images out of the storage device 204, to spin the plurality of reels (for example, 5 reels) and to display the video image that spinning concerned has been stopped at the predetermined timing on the display device 102. The plurality of symbols is indicated on each reel. When the reels are spinning, the control unit 201 controls so as to display the symbols indicated at the positions according to the state of spinning in the plurality of symbols indicated on the reels on the display device 102 while scrolling them sequentially and so as to stop scrolling for display at the predetermined timing. Thereafter, the process proceeds to step S13.

In step S13, the control unit 201 decides whether the displayed number of the predetermined symbols (for example, the symbol S1 in the example in FIG. 3) which has been displayed on the display device 102 after scrolling (spinning of the reels) for symbol display has been stopped satisfies the predetermined condition or not. In the present embodiment, it is allowed to set such a condition that the displayed number of the predetermined symbols is, for example, 5, 4 or 3 as the predetermined condition concerned. In a case where the condition concerned is satisfied (Yes in step S13), the process proceeds to step S14, and in a case where the condition concerned is not satisfied (No in step S13), the process proceeds to step S18.

In step S14, the control unit 201 controls so as to read the value of the parameter which has been set in advance in correspondence with the displayed number of the predetermined symbols which is specified in the result of display after scrolling has been stopped in the plurality of parameters out of the storage device 204, to increase the read-out value of the parameter concerned by a predetermined amount and to write it into the storage device 204. In the example illustrated in FIG. 3, when 5 symbols S1 have been displayed on the display device 102 after rotation of the reels has been stopped, the value of the parameter indicated on the gauge 36 which has been set in correspondence with the displayed number 5 is increased. Thereafter, the process proceeds to step S15.

In step S15, the control unit 201 reads the values of all the parameters out of the storage device 204 and decides whether there exists the parameter the value of which has reached the predetermined value (for example, 6 stars have been saved) in the plurality of parameters. In a case where there exists the parameter which has reached the predetermined value (Yes in step S15), the process proceeds to step S16 and in the other case (No in step S15), the process proceeds to step S18.

In step S16, the control unit 201 controls so as to grant the privilege which has been set in advance in correspondence with the parameter which has been decided to reach the predetermined value in step S15. Specifically, granting of the privilege means that, for example, the control unit 201 writes the data indicating that it is possible for the player who will receive granting of the privilege to utilize the privilege concerned into the storage device 204. For example, as the privileges, the credit and the right to play the free game are granted to the player. In a case where the privilege is the right to play the free game, the control unit 201 decides whether it is possible for the target player to play the free game or not on the basis of the data written into the storage device 204 at a later predetermined timing and is capable of starting execution of the free game when it has been decided to be possible.

In step S17, the control unit 201 reads the value of the parameter out of the storage device 204, clears the value of the parameter which has reached the predetermined value and writes the value of the parameter concerned into the storage device 204. In regard to the values of other parameters, they are maintained without being updated. For example, in the example in FIG. 3, in regard to the parameter for which 6 stars have been accumulated, accumulation of the stars is set to zero and accumulation of the stars for other parameters are maintained.

In step S18, the control unit 201 performs predetermined processing for terminating the game, and next in step S19, the control unit 201 decides whether playing of the game is terminated or not in accordance with presence/absence of putting-in of the bet for the game and the operation instruction to the game apparatus 100 by the player. In a case where it has been decided to terminate it (Yes in step S19), the process illustrated in FIG. 5 is terminated, and in the other case (No in step S19), the process proceeds to step S11.

As described above, according to the present embodiment, when the value of the parameter which has been accumulated in accordance with the result of each game has reached the predetermined value, the privilege which has been set in advance in correspondence with the parameter which has reached the predetermined value concerned is granted. As a result, it is allowed to stepwise raise expectations of the player for the privileges throughout the plurality of games. Accordingly, it is allowed to realize the game of higher entertaining property.

Altered Example

The present disclosure is not limited to the above-mentioned embodiments and may be performed by adding other various alterations within a range not deviating from the gist of the present disclosure. That is, the above-mentioned embodiments are merely illustrative in all respects, shall not be interpreted limitedly and may adopt various altered examples.

TABLE OF REFERENCE NUMERALS 100 game apparatus
101 loudspeaker 102 display device
103 operation input device
104 card reading device
105 bill putting-in device
106 ticket ejecting device
201 control unit
202 CPU
203 memory
204 storage device
205 voice processing unit
206 image processing unit
207 communication unit
208 peripheral device interface

What is claimed is:

1. A game apparatus comprising a control unit and a storage unit, wherein the control unit is configured to execute a program stored in the storage unit and thereby to carry out actions comprising:
 displaying one or more symbols on a display device;
 increasing, in accordance with the displayed symbols, a value of a parameter which has been set in advance in correspondence with a displayed number of predetermined symbols in a plurality of pre-set parameters, wherein an amount of the increase in the value is of the parameter is determined by lottery;
 when the value of the parameter has reached a predetermined value, storing, in a database, data indicating that a user has been granted a privilege according to the parameter which has reached the predetermined value concerned; and
 clearing the value of the parameter while maintaining the values of other parameters that have been set in accordance with a displayed number of symbols that are different from the predetermined symbols.

2. The game apparatus according to claim 1, wherein the more valuable privilege the granting function grants, the more number of the predetermined symbols which has been set in advance in correspondence with the parameter which has reached the predetermined value is displayed.

3. The game apparatus according to claim 2, wherein the more number of times the granting function grants a right to play a free game as the privilege, the more number of the predetermined symbols which has been set in advance in correspondence with the parameter which has reached the predetermined value is displayed.

4. A game apparatus comprising:
 a control unit; and
 a storage unit out of/into which data reading and writing are made from the control unit, wherein
 the control unit is programmed:
  to manage execution of a game,
  to read one or a plurality of symbol(s) out of the storage unit,
  to make the read-out one or plurality of symbols for every playing of the game displayed,
  to read a value of a parameter which has been set in advance in correspondence with a displayed number of predetermined symbols in a plurality of parameters which has been set in advance out of the storage unit, to increase, in accordance with the displayed symbol, the read-out value of the parameter concerned by an amount determined by lottery and to write the increased value into the storage unit,
  to read the values of the plurality of parameters out of the storage unit and to decide whether the value of any of the parameters reaches a predetermined value,
  to write data indicating that it is possible to utilize a privilege according to the parameter which has reached the predetermined value concerned into the storage unit when it has been decided that the value of the parameter reaches the predetermined value; and
  to clear the value of the parameter while maintaining the values of a remainder of the plurality of parameters that have been set in accordance with a displayed number of symbols that are different from the predetermined symbols.

5. A game controlling method which is performed by a game apparatus which possesses a control unit and a storage unit, the method comprising:
 displaying one or more symbols on a display device;
 increasing, in accordance with the displayed symbol, a value of a parameter which has been set in advance in correspondence with a displayed number of predetermined symbols in a plurality of pre-set parameters, wherein an amount of the increase in the value is of the parameter is determined by lottery;
 when the value of the parameter has reached a predetermined value, storing, in a database, data indicating that a user has been granted a privilege according to the parameter which has reached the predetermined value concerned, and
 clearing the value of the parameter while maintaining the values of other parameters that have been set in accordance with a displayed number of symbols that are different from the predetermined symbols.

* * * * *